United States Patent
Babka et al.

(10) Patent No.: US 9,390,090 B2
(45) Date of Patent: Jul. 12, 2016

(54) CONCURRENT LONG SPANNING EDIT SESSIONS USING CHANGE LISTS WITH EXPLICIT ASSUMPTIONS

(75) Inventors: James Joseph Babka, Austin, TX (US); Nikhil Raj Krishna, Austin, TX (US); Dilum Ranatunga, Austin, TX (US); Ryan Shillington, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1561 days.

(21) Appl. No.: 12/770,824

(22) Filed: Apr. 30, 2010

(65) Prior Publication Data

US 2011/0270805 A1 Nov. 3, 2011

(51) Int. Cl.
*G06F 17/30* (2006.01)

(52) U.S. Cl.
CPC .... *G06F 17/30017* (2013.01); *G06F 17/30365* (2013.01)

(58) Field of Classification Search
CPC .................. G06F 17/30017; G06F 17/30103; G06F 17/30011; G06F 17/30029
See application file for complete search history.

(56) References Cited

U.S. PATENT DOCUMENTS

| | | | |
|---|---|---|---|
| 5,778,370 A | 7/1998 | Emerson | 707/100 |
| 6,003,082 A * | 12/1999 | Gampper et al. | 709/225 |
| 6,061,798 A * | 5/2000 | Coley et al. | 726/12 |
| 6,275,863 B1 | 8/2001 | Leff et al. | 709/248 |
| 7,484,011 B1 * | 1/2009 | Agasaveeran et al. | 709/250 |
| 2002/0010715 A1 * | 1/2002 | Chinn et al. | 707/514 |
| 2004/0250259 A1 | 12/2004 | Lauterbach et al. | 719/315 |
| 2006/0155716 A1 | 7/2006 | Visishth et al. | 707/100 |
| 2007/0100859 A1 * | 5/2007 | Holmes et al. | 707/101 |
| 2008/0071817 A1 | 3/2008 | Gaurav et al. | 707/101 |
| 2009/0320110 A1 * | 12/2009 | Nicolson et al. | 726/6 |

OTHER PUBLICATIONS

International Search Report and Written Opinion for PCT Application No. PCT/EP2011/056628, mailed Jun. 27, 2011.

* cited by examiner

*Primary Examiner* — James Trujillo
*Assistant Examiner* — Fatima Mina
(74) *Attorney, Agent, or Firm* — Richard A. Wilhelm; Van Leeuwen & Van Leeuwen

(57) ABSTRACT

An approach is provided that receives a change request from a requestor. The change request includes metadata regarding the change, one or more changes, and one or more change assumptions corresponding to at least one of the changes. The change request is stored in a data store of pending requests. One or more systems are identified that correspond to each of the change assumptions. The identified systems are automatically queried with queries that correspond to the change assumptions. Query responses in response to the querying are received from the identified systems. The validity of each of the change assumptions is determined based on the received query responses. If the change assumptions are valid, then the changes included in the change request are processed. On the other hand, if at least one of the change assumptions is invalid, then the change request is rejected.

20 Claims, 9 Drawing Sheets

CONCURRENT LONG SPANNING EDIT SESSIONS USING CHANGE LISTS WITH EXPLICIT ASSUMPTIONS

BACKGROUND

Information handling systems often include object models that can be edited by multiple users. Conflicts can arise when conflicting submissions are received that pertain to a common object. Locking objects is infeasible and overly burdensome when object editing sessions lasts a relatively long period of time. Conversely, simply allowing concurrent edits of the same object can introduce many conflicts that can be difficult, or even impossible, to identify and resolve.

SUMMARY

An approach is provided that receives a change request from a requestor. The change request includes metadata regarding the change, one or more changes, and one or more change assumptions corresponding to at least one of the changes. The change request is stored in a data store of pending requests. One or more systems are identified that correspond to each of the change assumptions. The identified systems are automatically queried with queries that correspond to the change assumptions. Query responses in response to the querying are received from the identified systems. The validity of each of the change assumptions is determined based on the received query responses. If the change assumptions are valid, then the changes included in the change request are processed. On the other hand, if at least one of the change assumptions is invalid, then the change request is rejected.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
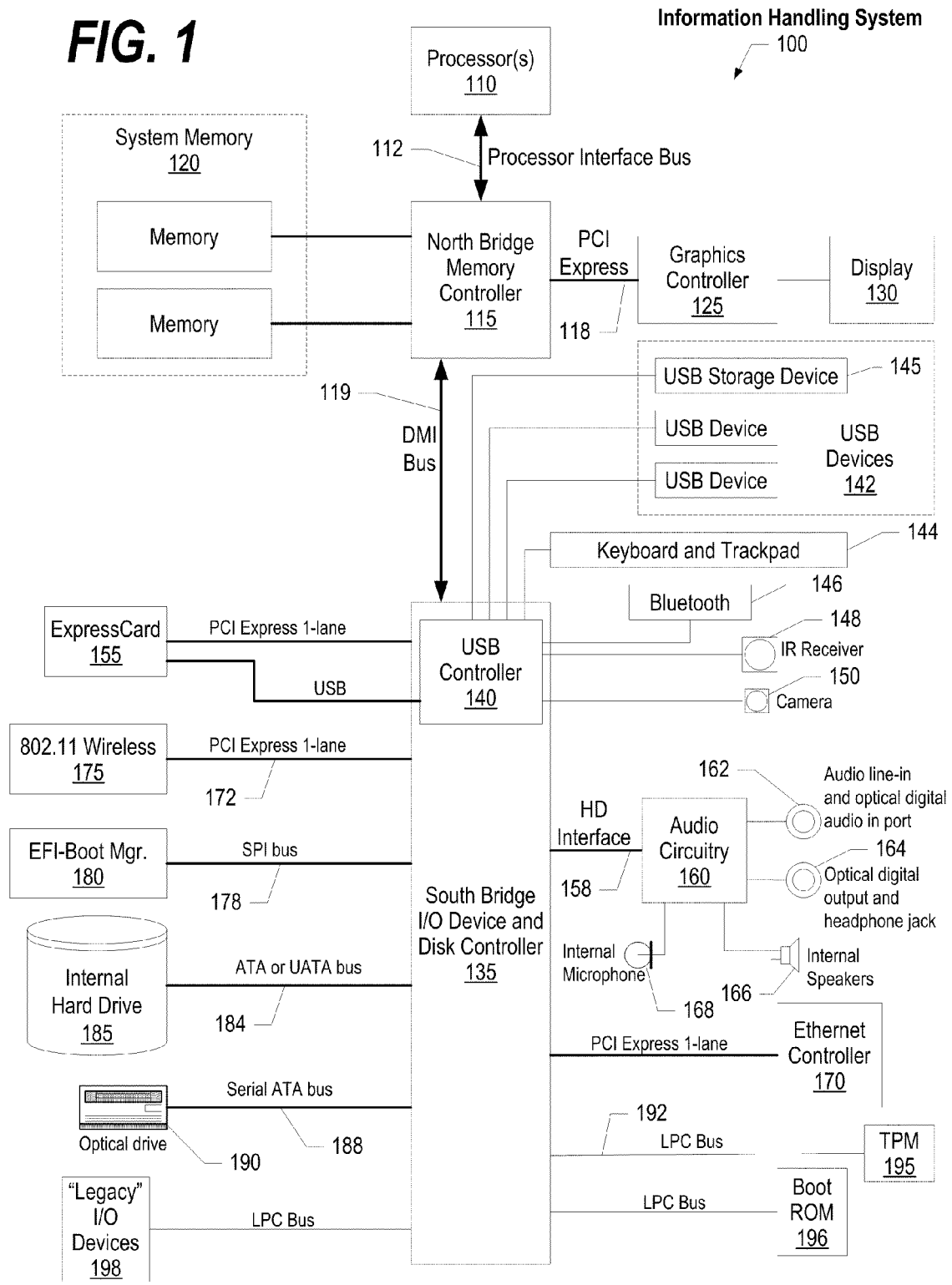
FIG. 1 is a block diagram of a data processing system in which the methods described herein can be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 2:
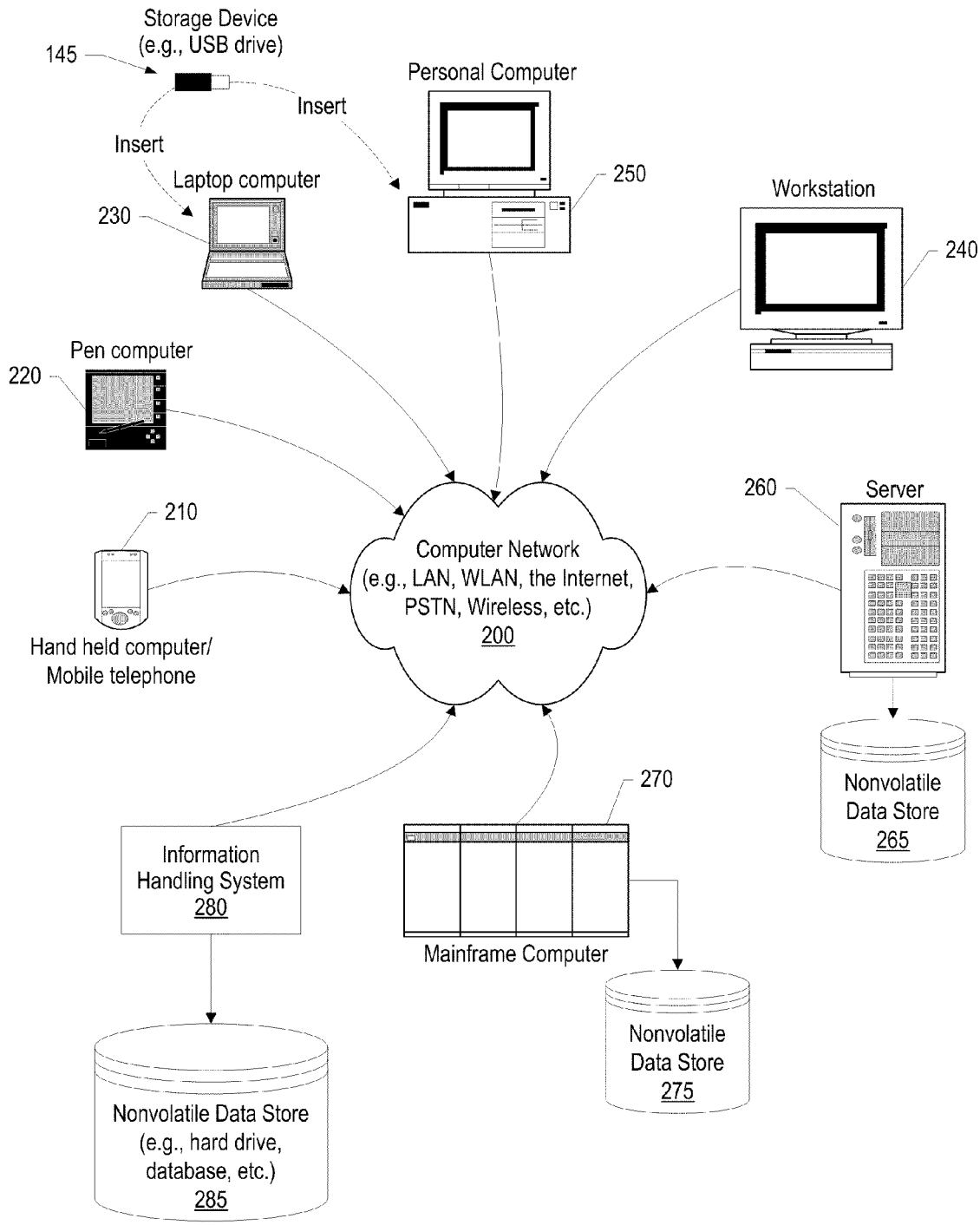
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wirelessly communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, mobile internet device, or other form factor computer or data processing system. In addition, an information handling system may take other form factors such as a personal digital assistant (PDA), a gaming device, ATM machine, a portable telephone device, a communication device or other devices that include a processor and memory.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
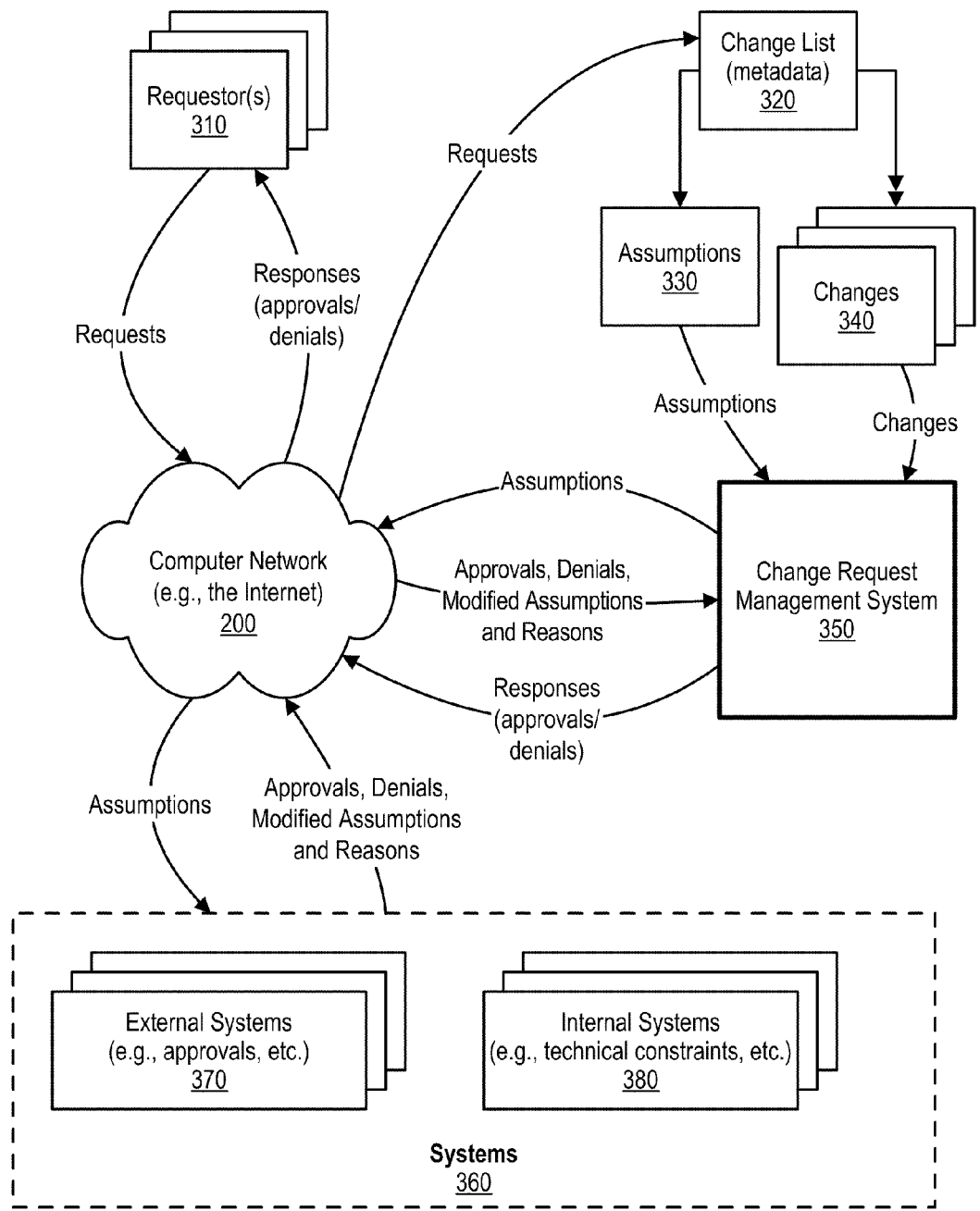
FIG. 3 is a high level diagram showing interaction of the processes and entities used to provide concurrent long spanning edit sessions using changelists with explicit assumptions.

FIG. 3 is a high level diagram showing interaction of the processes and entities used to provide concurrent long spanning edit sessions using change lists with explicit assumptions. Requestor 310 submits requests to change management system 350 for processing. In one embodiment, the requests are transmitted to change management system 350 from an information handling system utilized by the requestor via computer network 200. In this embodiment, the computer network facilitates communication between the requestors, that change management system, and systems 360. Systems 360 are a set of factors that change assumptions included with the request are checked against for validity. As shown, these systems include external factors (external systems 370) and internal factors (internal systems 380). The change request includes change list 320 which is metadata about the change request, change assumptions 330, and the actual changes 340.

Change management system 350 reads the change assumptions and uses the change assumptions to check the external and internal factors. Internal factors correspond to internal systems 380 and can automatically be checked using software that queries the internal systems based on the change assumptions. External factors correspond to external systems 370, such as approval by a decision maker, etc. In addition, in one embodiment, some of the external systems have the authority to modify change assumptions. For example, in a purchasing scenario, an internal change assumption may be that the requested item can be purchased if the price is below an assumed threshold. An external system, such as a manager, may have the authority to change the internal change assumption (e.g., raise or lower the price threshold). In addition, both the external and internal systems can provide reasons for both approving, and rejecting, a change assumption. In one embodiment, each of the internal change assumptions is checked each time one of the external systems is checked. For example, if three levels of management approval (external systems) are required, each of the internal change assumptions are checked after each of the approvals is given. In this manner, the internal systems can take into account changes that have occurred between submissions as well as take into account any modifications made to the change assumptions by any of the external systems.

Change management system 350 receives approvals, denials, modified assumptions, and reasons from systems 360. Based on the received information, change management system 350 generates responses, such as approval to perform the changes and rejections to the change request. If each of the change assumptions included in the change request is valid, then the changes are processed (e.g., a requested file is updated, a requested item is purchased, etc.). On the other hand, if any one of the change assumptions is invalid, then the change is rejected. In one embodiment, rejected change requests are retained in a data store of pending requests. In this embodiment, rejected change requests are re-submitted on a periodic basis (e.g., daily, weekly, monthly, etc.) until the request expires or until the invalid assumption(s) become(s) valid (for example, a manager rejection is changed to an approval) and the included changes are processed. In one embodiment, a counter is maintained of the number of times a change request has been processed. In this embodiment, the change request is removed from the data store of pending changes (deleted) when the counter reaches a predetermined limit (e.g., after three submissions, etc.).

Figure 4:
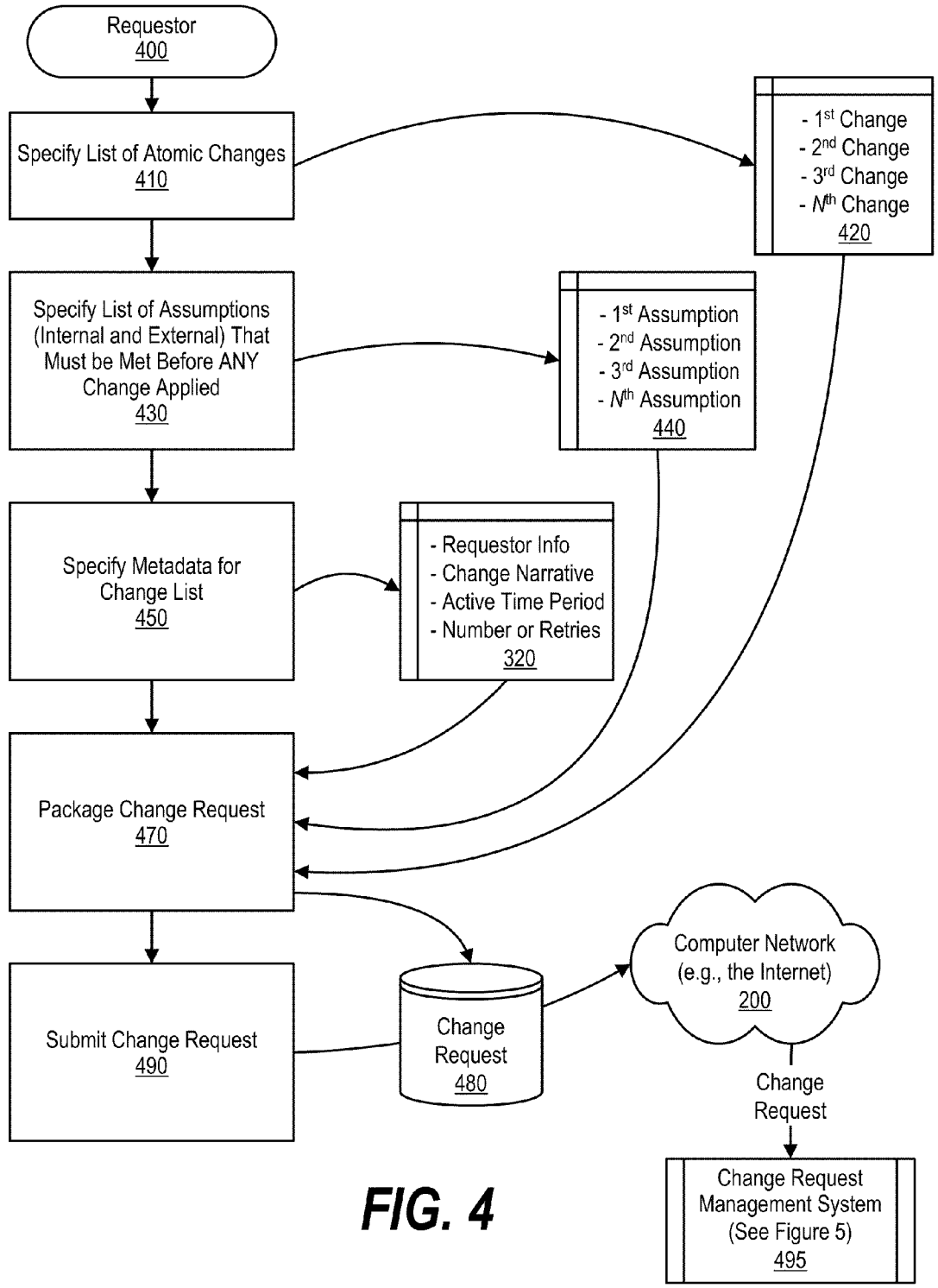
FIG. 4 is a flowchart showing steps taken by a requestor of a change request.

FIG. 4 is a flowchart showing steps taken by a requestor of a change request. Processing commences at 400 whereupon, at step 410, the requestor specifies a list of changes being requested to be applied atomically as a set. The list of changes is stored in memory area 420. At step 430, the requestor specifies a list of change assumptions and these change assumptions are stored in memory area 440. In one embodiment, the change assumptions include both internal change assumptions and external change assumptions. Also, in one embodiment, each of the change assumptions must be met (be valid) before any of the changes stored in memory area 420 are processed. Finally, in another embodiment, the list of change assumptions may be generated or augmented automatically (for example, the system may see that a particular variable value is being changed, and may add an assumption that the current value of that variable is the value at the time the change request was created).

At step 450, the requestor specifies metadata for the change list which is stored in memory area 320. Metadata can include the requestor's information (e.g., name, identifier, contact information, etc.), a change narrative that describes the change request that is being submitted, an active time period during which the change request can be processed, and a number of retries value that provides a predetermined limit on the number of times the change request should be retried before removing the change request from the change request management system.

At step 470, the change request is packaged into change request data store 480 (e.g., a computer file). The packaging process packages the specified list of changes, the list of assumptions, and the specified metadata into change request data store 480. At step 490, the change request (change request data store 480) is transmitted to the change request management system via computer network 200. Predefined process 495 details the processing performed by the change request management system when the change request is received (see FIG. 5 and corresponding text for processing details).

Figure 5:
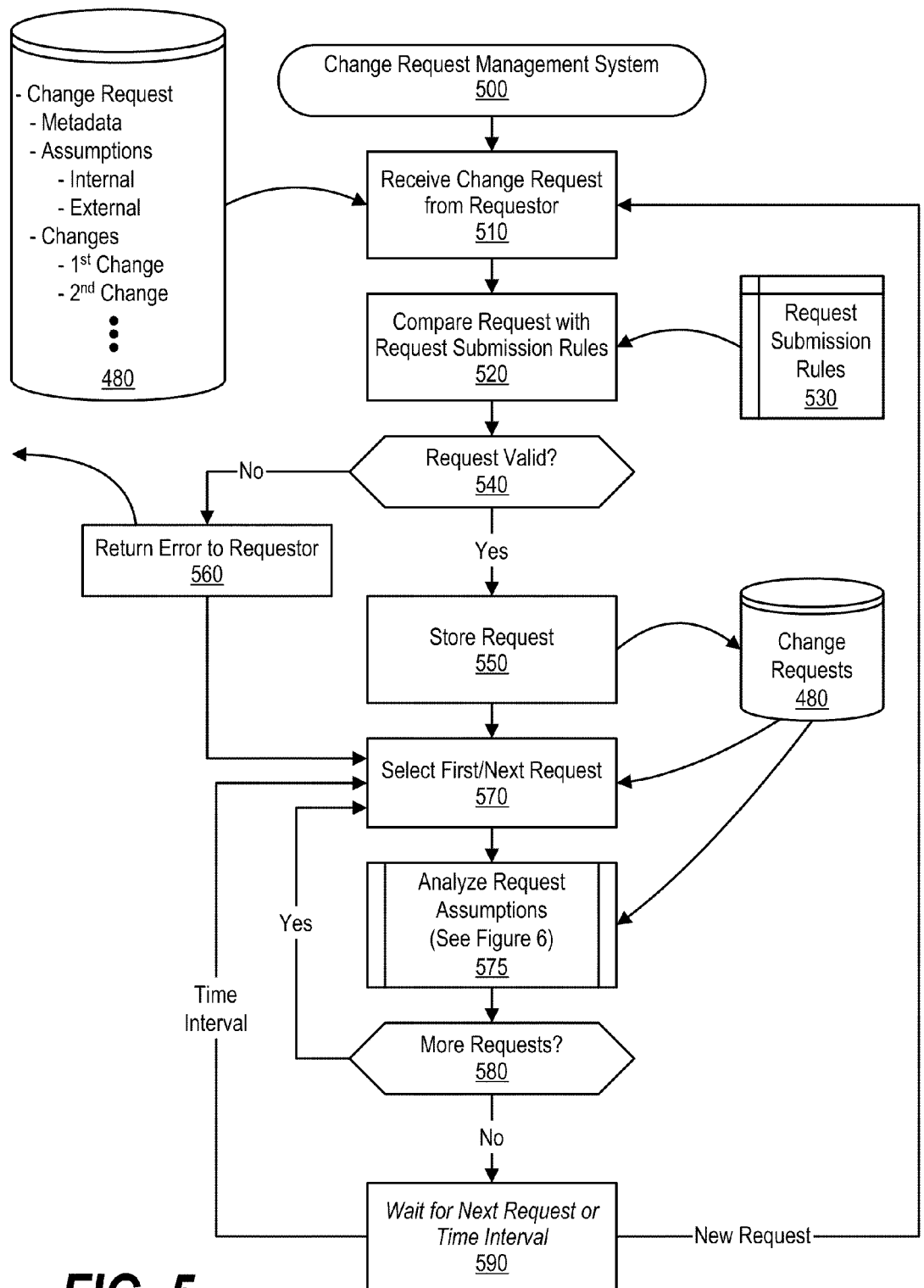
FIG. 5 is a flowchart showing steps taken by a change request management system.

FIG. 5 is a flowchart showing steps taken by a change request management system. Processing performed by the change request management system commences at 500 whereupon, at step 510, the change request management system receives change request 480 from a requestor. As shown, change request 480 includes the metadata, assumptions, and changes that were specified by the requestor. At step 520, the received request is compared with request submission rules 530 in order to determine if the change request is valid. For example, an organization could establish that only employees with a certain level can make various types of requests. If the requestor is not one of these employees, then the request would be denied. A determination is made as to whether the request is valid based on the comparison with the request submission rules (decision 540). If the request is not valid, then decision 540 branches to the "no" branch whereupon, at step 560, an error is returned to the requestor informing the requestor that the request was denied and will not be processed. On the other hand, if the request is valid, then decision 540 branches to the "yes" branch whereupon, at step 550, the received request is stored in data store of pending requests 480.

Periodically, the change request management system processes the requests stored in data store 480. At step 570, the first change request stored in data store 480 that is ready for processing is selected. A request is "ready for processing" based upon its metadata. For example, a pending request may have been previously rejected and is scheduled for weekly re-submission, in which case the pending request will not be selected at step 570 until a week has passed. At predefined process 575, the assumptions included in the selected request are analyzed and the change request is processed (see FIG. 6 and corresponding text for processing details). A determination is made as to whether there are more requests that are ready to be processed (decision 580). If there are more requests ready to be processed, then decision 580 branches to the "yes" branch which loops back to select the next request that is ready to be processed from data store 480 and processes it using predefined process 575. This looping continues until there are no more requests in data store 480 that are ready to be processed, at which point decision 580 branches to the "no" branch whereupon, at step 590, processing waits for the next new request to arrive or for a given time interval (e.g., hourly, daily, etc.). If the time interval is reached, then step 590 branches to the "time interval" branch which loops back to process the requests pending in data store 480. If a new request is received, then step 590 branches to the "new request" branch which loops back to receive the next request and process it as described above.

Figure 6:
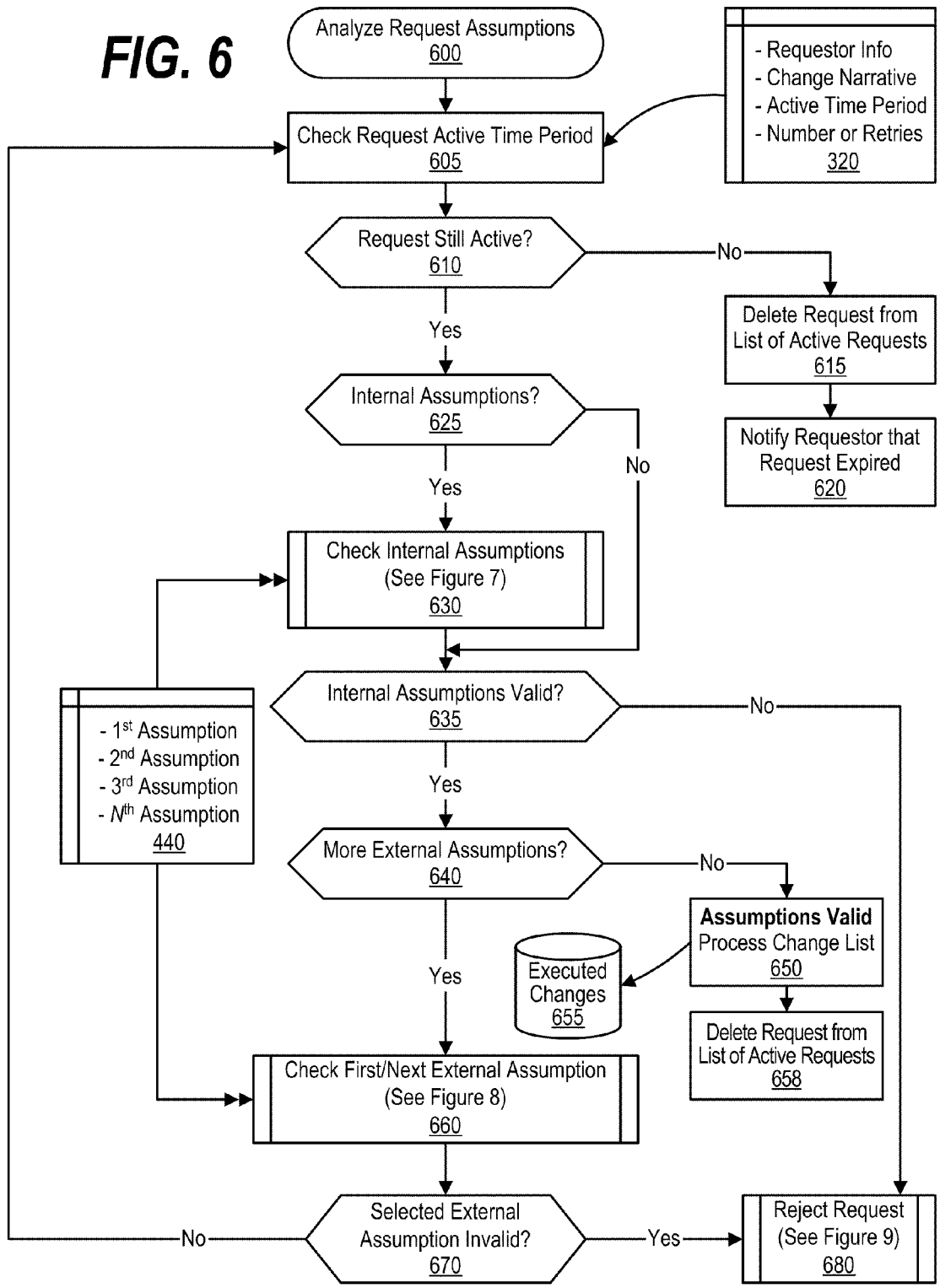
FIG. 6 is a flowchart showing steps taken to analyze request assumptions.

FIG. 6 is a flowchart showing steps taken to analyze request assumptions. This routine is called at predefined process 575 shown in FIG. 5. FIG. 6 processing commences at 600 whereupon, at step 605, change list metadata 320 is checked in order to identify if the request has expired based on the active time period. A determination is made as to whether the request is still active (decision 610). If the request is no longer active, decision 610 branches to the "no" branch whereupon, at step 615, the request is deleted from the data store of pending requests, and at step 620, the requestor is notified that the request has expired and has been deleted from the data store of pending requests.

On the other hand, if the request is still active, then decision 610 branches to the "yes" branch whereupon a determination is made as to whether there are any internal assumptions included with the request (decision 625). If there are one or more internal assumptions, then decision 625 branches to the "yes" branch whereupon, at predefined process 630, the internal assumptions included in assumptions 440 are processed (see FIG. 7 and corresponding text for processing details). On the other hand, if there are no internal assumptions included in the request, then decision 625 branches to the "no" branch bypassing predefined process 630.

A determination is made as to whether the internal assumptions (if any were checked) are valid (decision 635). If one or more of the internal assumptions are invalid, then decision 635 branches to the "no" branch whereupon, at predefined process 680, the request is rejected (see FIG. 9 and corresponding text for rejection processing details). On the other hand, if the internal assumptions are valid, then decision 635 branches to the "yes" branch whereupon a determination is made as to whether there are any external assumptions that need to be checked (decision 640). If there are no external assumptions to be checked, then decision 640 branches to the "no" branch whereupon, at step 650, the assumptions are valid and the change list included in the change request is processed. The processing of the change request is different depending upon the type of change being performed (e.g., document control, procurement, etc.). However, when the change request is processed, the executed change is recorded in data store 655 and the request is deleted from the list of active requests at step 658. On the other hand, if there are more external assumptions, then decision 640 branches to the "yes" branch whereupon predefined process 660 is executed to select the first external assumption from assumptions 440 and check it for validity (see FIG. 8 and corresponding text for external assumption processing details).

A determination is made as to whether the selected external assumption was invalid (decision 670). If the selected external assumption is invalid, then decision 670 branches to the "yes" branch whereupon, at predefined process 680, the request is rejected (see FIG. 9 and corresponding text for rejection processing details). On the other hand, if the selected external assumption is not invalid, then decision 670 branches to the "no" branch which loops back to step 605 to recheck whether the request is still active and recheck the internal assumptions. In one embodiment, the internal assumptions are rechecked after each external assumption is selected and determined to be valid. If the internal assumptions are still valid, then decision 635 will branch to the "yes" branch and, if there are more external assumptions to check, decision 640 will branch to the "yes" branch to select and check the next external assumption for validity and then loop back around to again to recheck whether the request is still active and recheck the internal assumptions. This selection and checking of external assumptions and looping to recheck whether the request is active and recheck the internal assumptions continues until all of the external assumptions have been selected and checked. When there are no more external assumptions to check and all external assumptions and internal assumptions are valid, then decision 640 branches to the "no" branch whereupon, at step 650, the change list included in the change request is processed.

Figure 7:
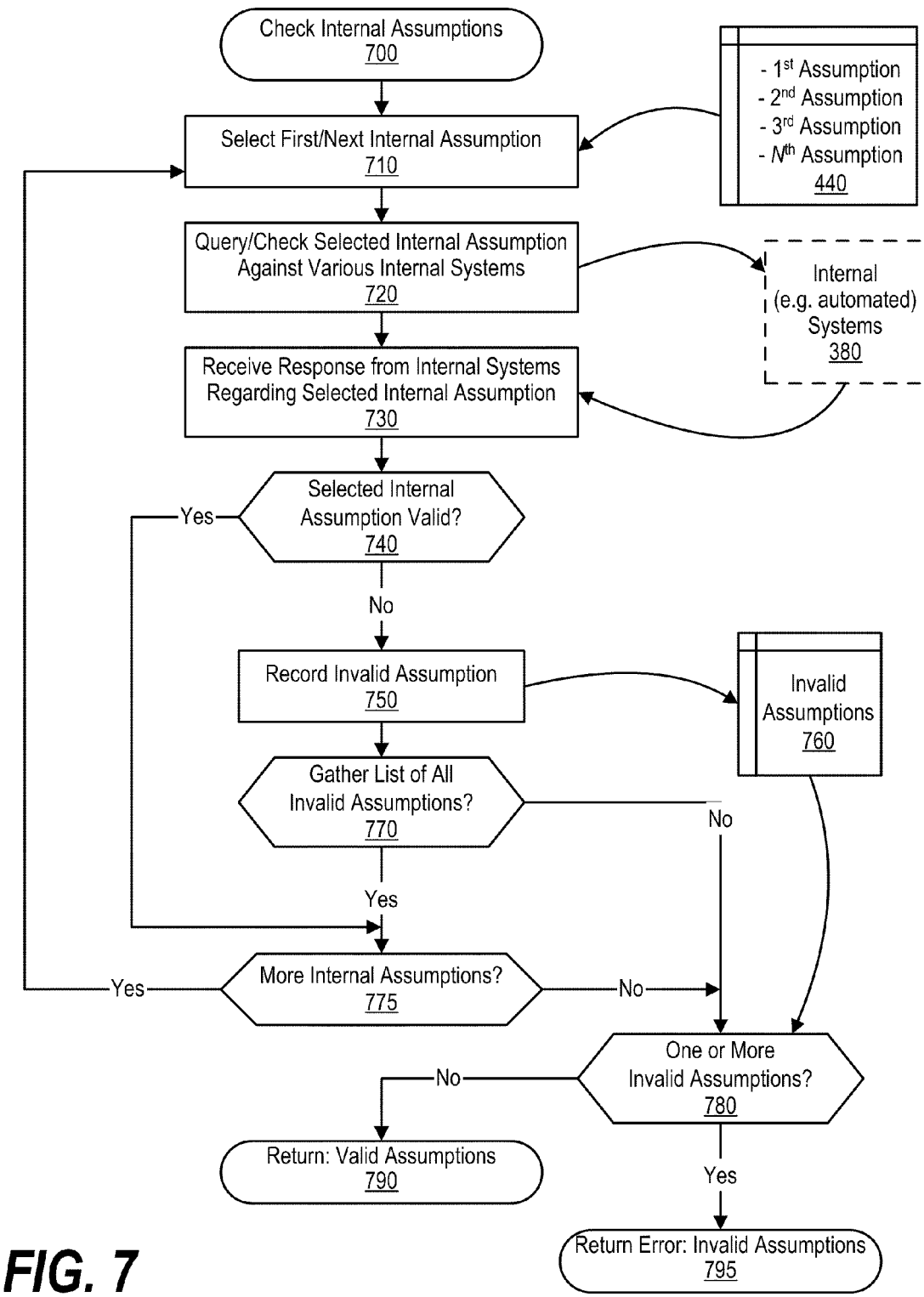
FIG. 7 is a flowchart showing steps taken to check internal assumptions.

FIG. 7 is a flowchart showing steps taken to check internal assumptions. This routine is called by predefined process 630 shown in FIG. 6. Processing of FIG. 7 commences at 700 whereupon, at step 710, the first internal assumption is selected from assumptions 440. At step 720, the selected internal assumption is checked by querying it against various internal systems 380. At step 730, one or more responses are received from the internal systems. A determination is made, based on the received responses, as to whether the selected internal assumption is valid (decision 740). If the selected internal assumption is not valid, then decision 740 branches to the "no" branch whereupon, at step 750, the invalid assumption is recorded in invalid assumptions memory area 760. A determination is made as to whether the system is set to gather a list of all invalid internal assumptions or whether to stop after one invalid internal assumption is identified (decision 770). If processing stops after the first invalid internal assumption is encountered, then decision 770 branches to the "no" branch leading to decision 780 described below, otherwise processing of the list of internal assumptions continues with decision 770 branching to the "yes" branch.

Returning to decision 740, if the selected internal assumption is valid, then decision 740 branches to the "yes" branch bypassing step 750 and decision 770. A determination is made as to whether there are more internal assumptions to check (decision 775). If there are more internal assumptions to check, then decision 775 branches to the "yes" branch which loops back to step 710 to select the next internal assumption from assumptions 440. This looping continues until all of the internal assumptions have been processed, at which point decision 775 branches to the "no" branch leading to decision 780.

A determination is made as to whether one or more invalid internal assumptions were identified during the processing of the internal assumptions list (decision 780). If no invalid internal assumptions were identified, then decision 780 branches to the "no" branch whereupon processing returns at 790 with a flag indicating that the internal assumptions have been checked and are valid. On the other hand, if one or more of the internal assumptions are invalid, then decision 780 branches to the "yes" branch whereupon processing returns at 795 with a flag indicating that one or more internal assumptions are invalid.

Figure 8:
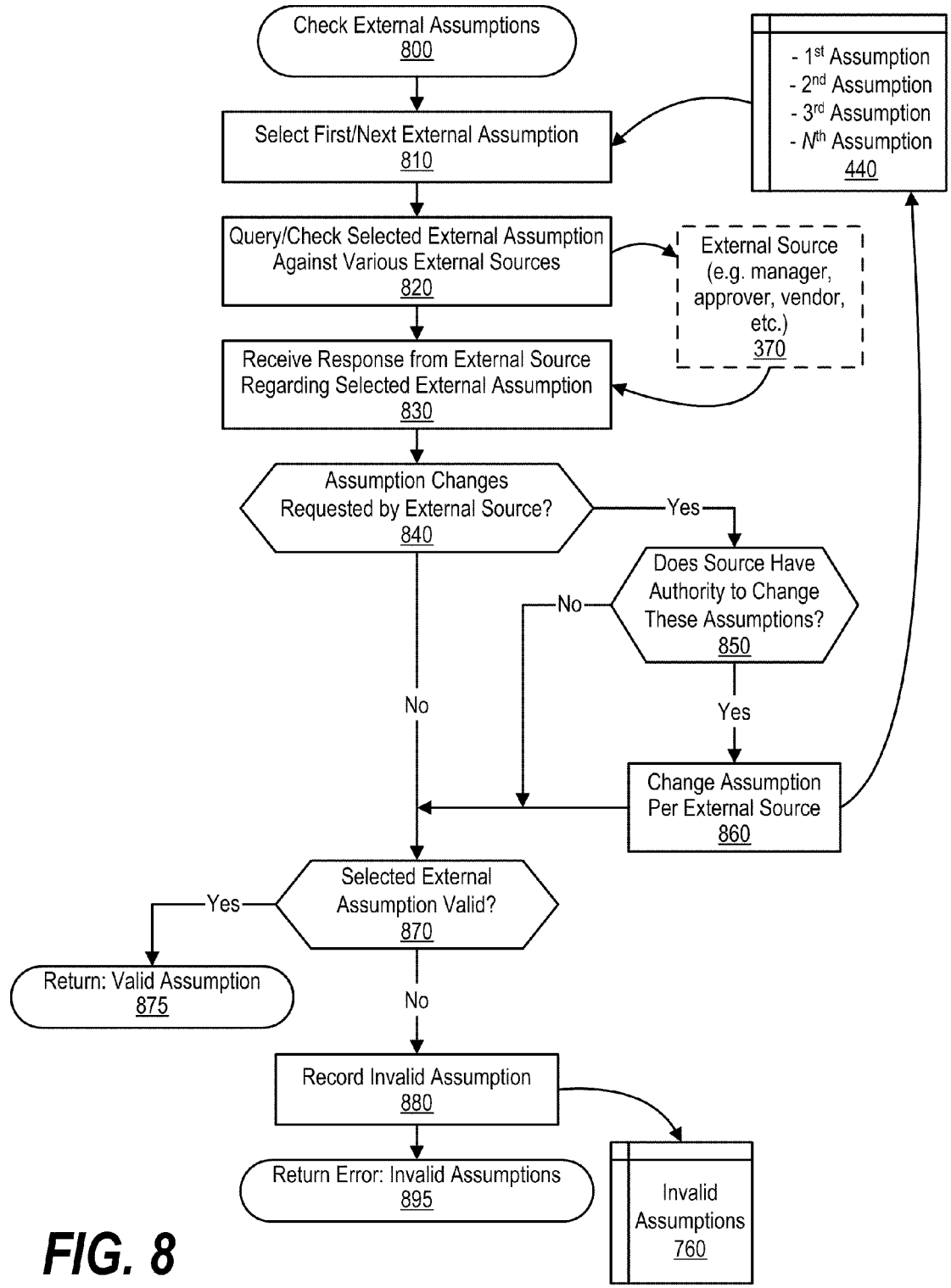
FIG. 8 is a flowchart showing steps taken to check external assumptions.

FIG. 8 is a flowchart showing steps taken to check external assumptions. This routine is called by predefined process 660 shown in FIG. 6. FIG. 8 processing commences at 800 whereupon, at step 810, the first external assumption is selected from assumptions 440. At step 820 the selected external assumption is checked against one or more external systems 370 (e.g., external sources such as by sending a note to a manager for approval, etc.). At step 830, a response is received from the external source(s).

A determination is made as to whether the external systems have requested a modification of one or more of the assumptions included in assumptions 440. If the external system has requested a modification of one or more of the assumptions, then decision 840 branches to the "yes" branch whereupon a determination is made as to whether the external system has the authority to modify the requested assumption(s) (decision 850). If the external system has the needed authority, then decision 850 branches to the "yes" branch whereupon the assumption(s) selected by the external system is modified at step 860. Note that in one embodiment, the external system can modify both external and internal assumptions included in assumptions 440. On the other hand, if the external system does not have the authority needed to modify the selected assumption(s) then decision 850 branches to the "no" branch bypassing step 860.

A determination is made as to whether the selected external assumption is valid (decision 870). If the selected external assumption is valid, then decision 870 branches to the "yes" branch whereupon processing returns at 875 with a flag indicating that the external assumption is valid. On the other hand, if the selected external assumption is invalid, then decision 870 branches to the "no" branch whereupon, at step 880, the invalid external assumption is recorded in invalid assumptions memory area 760 along with any reasons provided by the external system for rejecting the external assumption. Processing then returns to the calling routine at 895 with a flag indicating that the external assumption is invalid.

Figure 9:
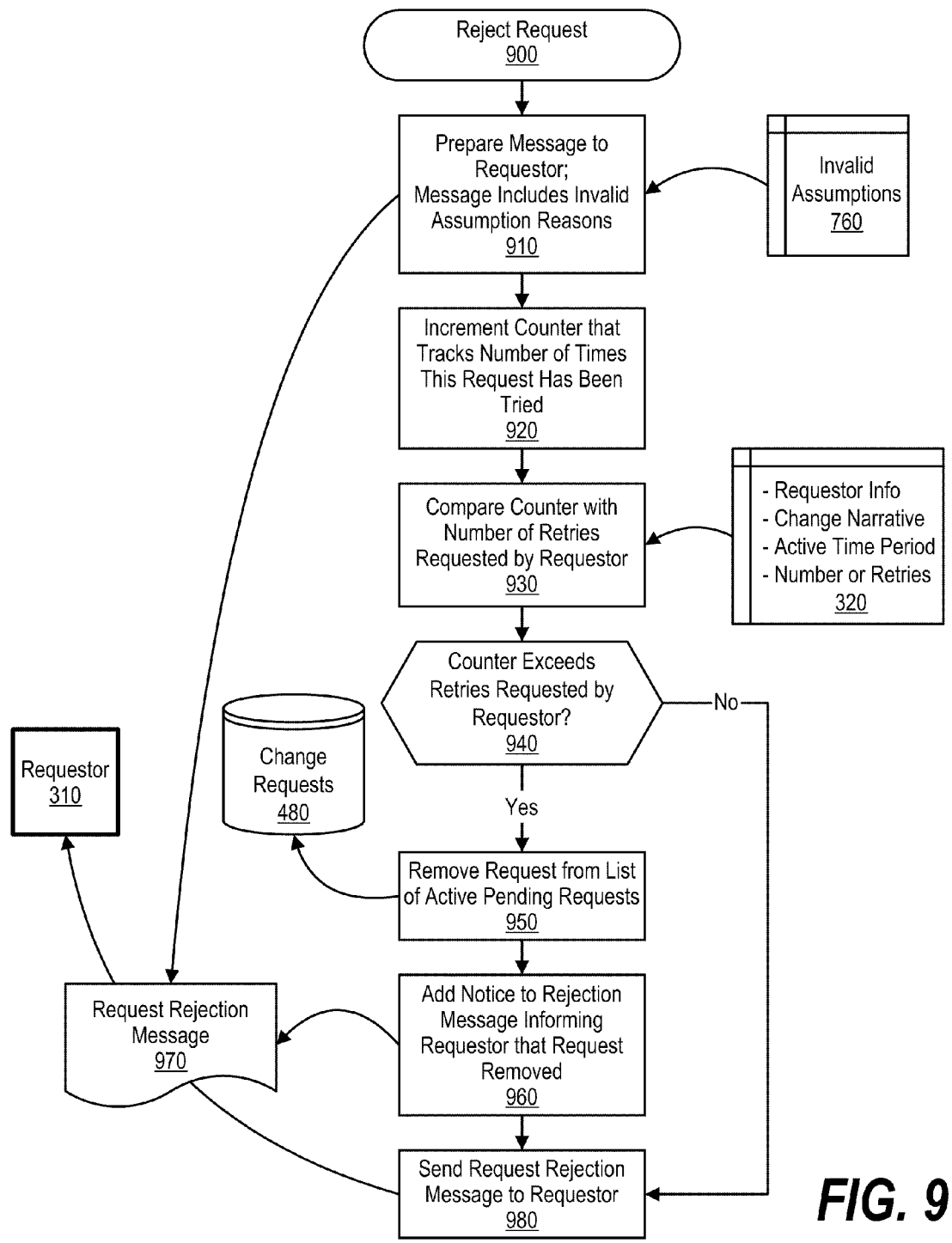
FIG. 9 is a flowchart showing steps taken when a request is rejected.

FIG. 9 is a flowchart showing steps taken when a request is rejected for any reason other than because the request is invalid. This routine is called by predefined process 680 shown in FIG. 6. FIG. 9 processing commences at 900 whereupon, at step 910 message 970 (e.g., an email note, etc.) is prepared to the requestor with the message including the reasons that one or more of the internal and/or external assumptions were invalid as recorded in invalid assumptions memory area 760. At step 920, a counter that tracks the number of times that this request has been rejected is incremented. At step 930, the incremented counter is compared to a predefined limit, such as a limit provided by the requestor in request metadata 320. A determination is made as to whether the counter exceeds the number of retries set by the predefined limit (decision 940). If the counter exceeds the number of retries set by the predefined, then decision 940 branches to the "yes" branch whereupon, at step 950, the request is removed from data store of pending requests 480. At step 960, a notice is added to rejection message 970 informing the requestor that the request has been removed from the data store of pending requests due to the predefined retry limit being reached. Returning to decision 940, if the counter does not exceed the retries set by the predefined limit, then decision 940 branches to the "no" branch bypassing steps 950 and 960.

At step 980, request rejection message 970 is sent to requestor 310. The requestor now has reasons for the rejection as well as knowledge of whether the request has been removed from the data store of pending requests. The requestor can analyze these reasons and determine if changes should be made to the request (or if a new request should be created using steps shown in FIG. 4) and resubmitted to the change request management system shown in FIG. 3.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

One of the implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. An information handling system comprising:
   one or more processors;
   a memory accessible by at least one of the processors;
   a nonvolatile storage medium accessible by at least one of the processors;
   a set of instructions stored in the memory and executed by at least one of the processors in order to perform steps of:
   receiving a change request from a requestor, wherein the change request includes metadata regarding the change, one or more changes, and one or more change assumptions corresponding to at least one of the changes, wherein the one or more change assumptions require validation prior to processing one or more of the changes;
   storing the request in a data store of pending requests, the data store being stored in the nonvolatile storage medium;
   identifying one or more systems that correspond to each of the change assumptions;
   automatically querying one or more of the identified systems with one or more queries that correspond to the change assumptions;
   receiving one or more query responses in response to the querying;
   determining a validity, based on the received query responses, of each of the change assumptions;
   processing the one or more changes included in the change request in response to determining that each of the change assumptions is valid; and
   rejecting the change request in response to determining that at least one of the change assumptions is invalid.

2. The information handling system of claim 1 wherein the change assumptions include one or more internal change assumptions and one or more external change assumptions, and wherein the steps further comprise:
   determining the validity, based on the received query responses, of each of the internal change assumptions; and
   checking an external validity of each of the external change assumptions, wherein each of the external change assumptions is checked against an external source, wherein the processing of the one or more changes is performed in response to determining that each of the internal change assumptions and each of the external change assumptions is valid.

3. The information handling system of claim 2 wherein the steps further comprise:
   receiving, from one of the external sources, one or more assumption changes; and
   modifying the one or more change assumptions based on the assumption changes received from the external source.

4. The information handling system of claim 3 wherein the steps further comprise:
   prior to modifying the one or more change assumptions, verifying that the external source from which the assumption change was received is authorized to modify the change assumptions corresponding to the received assumption changes, wherein the modification of the change assumptions is performed in response to the external source being verified.

5. The information handling system of claim 2 wherein the steps further comprise:
   re-determining the validity of each of the internal change assumptions after checking the external validity of each of the external change assumptions.

6. The information handling system of claim 1 wherein the rejecting step further comprises:
   preparing a message that includes one or more reasons corresponding to each of the invalid change assumptions;
   sending the prepared message to the requestor;
   incrementing a counter that tracks a number of times that the request has been rejected;

comparing the incremented counter with a predefined limit;

removing the request from the data store of pending requests in response to the comparison revealing that the request has been rejected the predefined limit of times; and retaining the request in the data store of pending requests in response to the comparison revealing that the request has not been rejected the predefined limit of times, wherein the request is reprocessed after a predefined amount of time has passed.

7. A computer program product stored in a computer readable storage medium, comprising functional descriptive material that, when executed by an information handling system, causes the information handling system to perform steps comprising:

receiving a change request from a requestor, wherein the change request includes metadata regarding the change, one or more changes, and one or more change assumptions corresponding to at least one of the changes, wherein the one or more change assumptions require validation prior to processing one or more of the changes;

storing, in a nonvolatile storage medium, the request in a data store of pending requests;

identifying one or more systems that correspond to each of the change assumptions;

automatically querying one or more of the identified systems with one or more queries that correspond to the change assumptions;

receiving one or more query responses in response to the querying;

determining a validity, based on the received query responses, of each of the change assumptions;

processing the one or more changes included in the change request in response to determining that each of the change assumptions is valid; and rejecting the change request in response to determining that at least one of the change assumptions is invalid.

8. The computer program product of claim 7 wherein the change assumptions include one or more internal change assumptions and one or more external change assumptions, and wherein the steps further comprise:

determining the validity, based on the received query responses, of each of the internal change assumptions; and checking an external validity of each of the external change assumptions, wherein each of the external change assumptions is checked against an external source, wherein the processing of the one or more changes is performed in response to determining that each of the internal change assumptions and each of the external change assumptions is valid.

9. The computer program product of claim 8 wherein the steps further comprise:

receiving, from one of the external sources, one or more assumption changes; and modifying the one or more change assumptions based on the assumption changes received from the external source.

10. The computer program product of claim 9 wherein the steps further comprise:

prior to modifying the one or more change assumptions, verifying that the external source from which the assumption change was received is authorized to modify the change assumptions corresponding to the received assumption changes, wherein the modification of the change assumptions is performed in response to the external source being verified.

11. The computer program product of claim 8 wherein the steps further comprise:

re-determining the validity of each of the internal change assumptions after checking the external validity of each of the external change assumptions.

12. The computer program product of claim 7 wherein the rejecting step further comprises:

preparing a message that includes one or more reasons corresponding to each of the invalid change assumptions; and sending the prepared message to the requestor.

13. The computer program product of claim 12 wherein the rejecting step further comprises:

incrementing a counter that tracks a number of times that the request has been rejected;

comparing the incremented counter with a predefined limit;

removing the request from the data store of pending requests in response to the comparison revealing that the request has been rejected the predefined limit of times; and retaining the request in the data store of pending requests in response to the comparison revealing that the request has not been rejected the predefined limit of times, wherein the request is reprocessed after a predefined amount of time has passed.

14. A computer-implemented method comprising:

receiving a change request from a requestor, wherein the change request includes metadata regarding the change, one or more changes, and one or more change assumptions corresponding to at least one of the changes, wherein the one or more change assumptions require validation prior to processing one or more of the changes;

storing, in a nonvolatile storage medium, the request in a data store of pending requests;

identifying one or more systems that correspond to each of the change assumptions;

automatically querying one or more of the identified systems with one or more queries that correspond to the change assumptions;

receiving one or more query responses in response to the querying;

determining a validity, based on the received query responses, of each of the change assumptions;

processing the one or more changes included in the change request in response to determining that each of the change assumptions is valid; and rejecting the change request in response to determining that at least one of the change assumptions is invalid.

15. The computer-implemented method of claim 14 wherein the change assumptions include one or more internal change assumptions and one or more external change assumptions, and further comprising:

determining the validity, based on the received query responses, of each of the internal change assumptions; and checking an external validity of each of the external change assumptions, wherein each of the external change assumptions is checked against an external source, wherein the processing of the one or more changes is performed in response to determining that each of the internal change assumptions and each of the external change assumptions is valid.

16. The computer-implemented method of claim 15 further comprising:
receiving, from one of the external sources, one or more assumption changes; and
modifying the one or more change assumptions based on the assumption changes received from the external source.

17. The computer-implemented method of claim 16 further comprising:
prior to modifying the one or more change assumptions, verifying that the external source from which the assumption change was received is authorized to modify the change assumptions corresponding to the received assumption changes, wherein the modification of the change assumptions is performed in response to the external source being verified.

18. The computer-implemented method of claim 15 further comprising:
re-determining the validity of each of the internal change assumptions after checking the external validity of each of the external change assumptions.

19. The computer-implemented method of claim 14 further comprising:
preparing a message that includes one or more reasons corresponding to each of the invalid change assumptions; and
sending the prepared message to the requestor.

20. The computer-implemented method of claim 19 further comprising:
incrementing a counter that tracks a number of times that the request has been rejected;
comparing the incremented counter with a predefined limit;
removing the request from the data store of pending requests in response to the comparison revealing that the request has been rejected the predefined limit of times; and
retaining the request in the data store of pending requests in response to the comparison revealing that the request has not been rejected the predefined limit of times, wherein the request is reprocessed after a predefined amount of time has passed.

* * * * *